(No Model.) 2 Sheets—Sheet 1.
W. E. WILD.
GRAIN CLEANER, SEPARATOR AND GRADER.
No. 275,104. Patented Apr. 3, 1883.
Fig: 1.
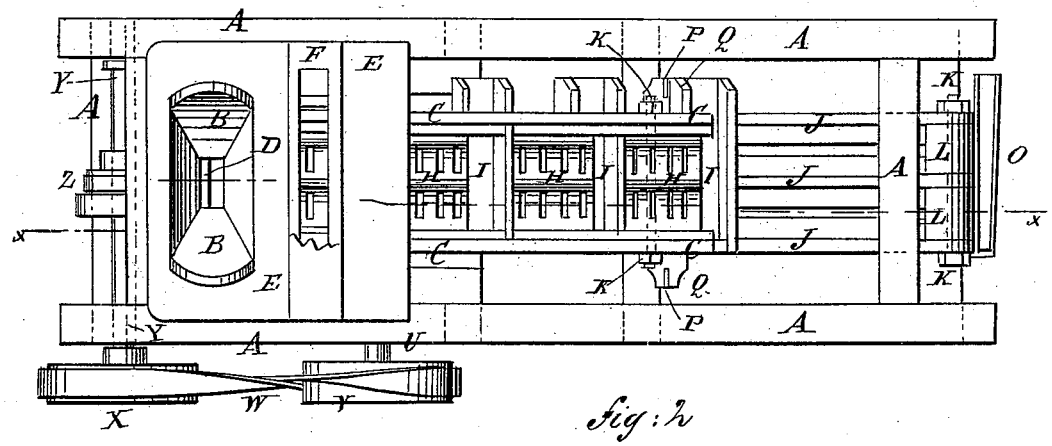
Fig: 2.
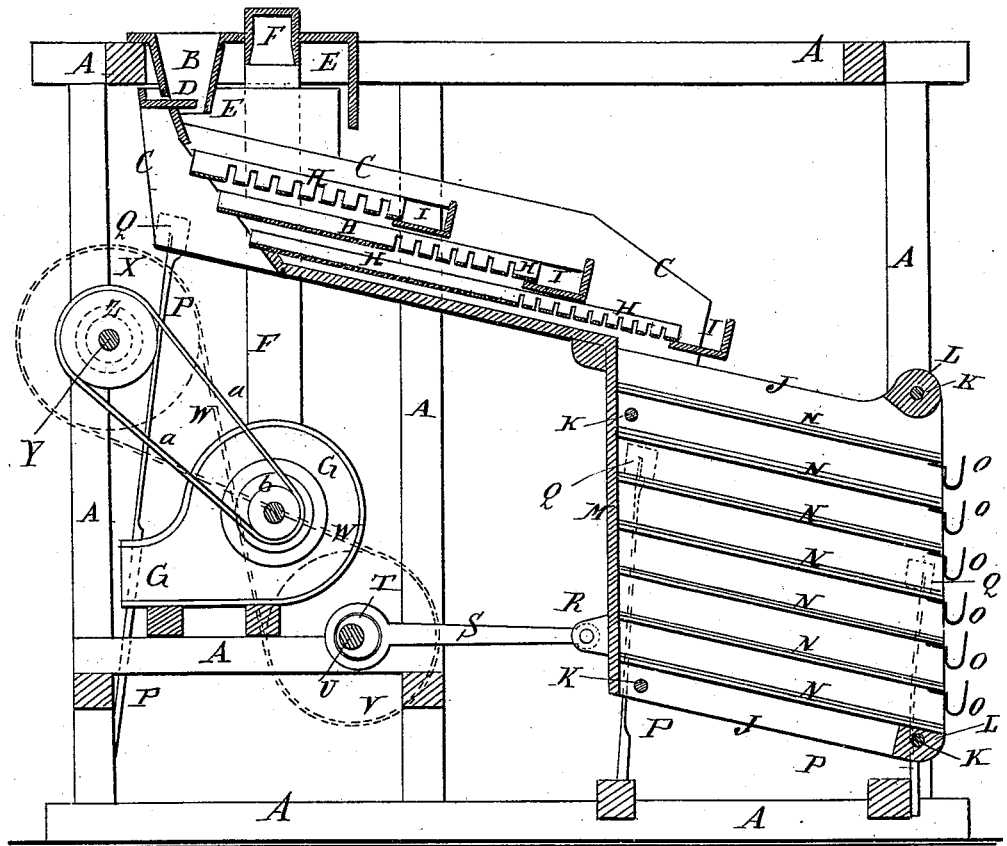
WITNESSES:
Chas. Nida.
C. Sedgwick
INVENTOR:
W. E. Wild
BY Munn & Co.
ATTORNEYS.

(No Model.) 2 Sheets—Sheet 2.
W. E. WILD.
GRAIN CLEANER, SEPARATOR AND GRADER.
No. 275,104. Patented Apr. 3, 1883.
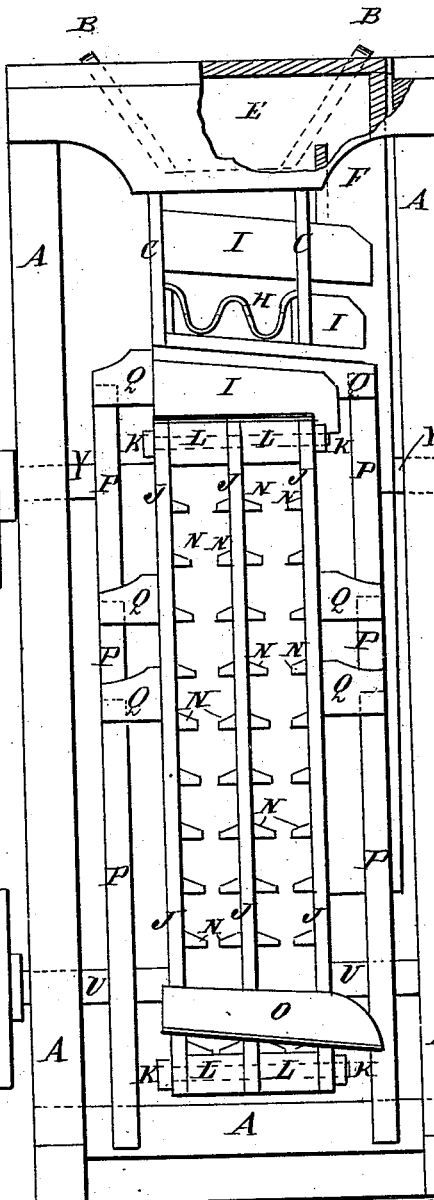
WITNESSES:
INVENTOR:
BY
ATTORNEYS.

UNITED STATES PATENT OFFICE.

WILLIAM E. WILD, OF CANDALARA, NEVADA.

GRAIN CLEANER, SEPARATOR, AND GRADER.

SPECIFICATION forming part of Letters Patent No. 275,104, dated April 3, 1883.

Application filed August 10, 1882. (No model.)

*To all whom it may concern:*

Be it known that I, WILLIAM E. WILD, of Candalara, in the county of Esmeralda and State of Nevada, have invented certain new and useful Improvements in Grain Cleaners, Separators, and Graders, of which the following is a full, clear, and exact description.

Reference is to be had to the accompanying drawings, forming part of this specification, in which similar letters of reference indicate corresponding parts in all the figures.

Figure 1 is a plan view of my improvement. Fig. 2 is a sectional side elevation of the same on line $x\,x$, Fig. 1. Fig. 3 is a rear elevation of the same, part being broken away. Figs. 4 and 5 are vertical sections of parts of the ribbed plates enlarged, showing modifications in the forms of the ribs.

My invention relates to improvements in grain cleaners, separators, and graders; and it consists in the peculiar construction and arrangement of the parts, as hereinafter fully set forth, and pointed out in the claims.

A is the frame of the machine. To the top of the forward part of the frame A is attached the hopper B, from which the grain to be operated upon passes into the upper part of the sieve-box C. The forward side of the hopper B does not extend quite so low as the rear side, which is slotted to receive the horizontal plate D, upon which the contents of the said hopper rest, and between the inner edge of which and the forward side of the hopper the said contents escape to the shoe C. The plate D is attached to the upper end of the shoe C, so that it will be moved forward and back by the vibrations of the shoe to produce an intermittent feed.

To the frame A, and in rear of the hopper B, and over the upper part of the shoe C, is secured an air-chamber, E, from the upper part of which a spout, F, leads to the suction-fan G, secured to the lower forward part of the frame A. The air-chamber E is open upon the lower side, so that the suction-draft will withdraw the chaff and other light impurities from the grain while falling upon and passing down the upper part of the upper sieve, H, and carry it out through the spout F and suction-fan G. The sieves H, three (more or less) of which are used, are placed in grooves in the inner surfaces of the sides of the shoe C, are corrugated longitudinally, as shown in Figs. 1 and 3, and have short cross-slots formed through them in the bottoms of the said corrugations, as shown in Figs. 1 and 2.

Each lower sieve H is made longer than the one above it, and has narrower slots, so that the upper sieve will take out the largest unthrashed heads and the coarsest impurities, and the succeeding sieves will take the smaller unthrashed heads and the smaller impurities. The cross-slots of each lower sieve extend from its lower end to the lower end of the next upper sieve, so that the part of each sieve that is beneath another sieve will be free from cross-slots, to prevent anything longer than a kernel of wheat from passing through the said slots endwise.

To the shoe C, at the lower end of each sieve H, is secured a spout, I, to receive the impurities that will not pass through the said sieves, and discharge the said impurities into receivers, whence they can be taken to a thrashing-machine and again passed through it. The grain that passes through the lowest sieve H falls upon the inclined bottom of the shoe C, slides down it, and falls from its lower end into the spaces between the vertical plates J. The plates J are rhomboidal in form, are secured to each other at their four corners by bolts K, and are kept the proper distance apart at their outer corners by blocks L, interposed between them, and at their inner ends by a plate, M, attached to the said ends.

Upon the adjacent sides of the plates J are formed pairs of ribs N, the ribs of each pair being directly opposite each other. The ribs N of each lower pair are made a little larger than the pair next above them, so that the spaces between the successive pairs of ribs will gradually decrease in size, as shown in Fig. 3. The ribs N may have their upper sides inclined downward and their adjacent edges vertical, as shown in Fig. 3, or may have their upper sides inclined downward and their adjacent edges inclined from each other, as shown in Fig. 4, or may have their upper sides concaved and their lower sides inclined from each other, as shown in Fig. 5. With this construction, as the grain passes through the spaces between the plates J, the kernels of grain smaller than the space between the ribs of each pair will fall through to the next pair, and the kernels of grain too large to pass through the space between any pair of ribs will slide down the said ribs and fall from their lower ends.

To the outer edges of the plates J are attached as many spouts O as there are pairs of ribs between the said plates to carry each grade of grain to its own receiver. The plates J and shoe C are rigidly connected together, and are supported by upright springs P, the lower ends of which are attached to the frame A, and their upper ends are attached to blocks Q, secured to the outer sides of the outer plates, J, and of the shoe C, so that the said plates and shoe can be vibrated together.

To the lower part of the plate M is attached a block, R, to which is hinged the end of a pitman, S, the other end of which is connected with an eccentric, T, attached to the shaft U, so that the plates J and shoe C will be vibrated by the revolution of the said eccentric and shaft. The shaft U revolves in bearings attached to the lower part of the frame A, and to it is attached a pulley, V, around which passes a belt, W. The belt W also passes around a pulley, X, attached to the shaft Y, which revolves in bearings attached to the upper part of the frame A.

To the shaft Y is attached a cone-pulley, Z, around which passes a belt, a. The belt a also passes around a corresponding cone-pulley, b, attached to the shaft of the fan-blower G.

Power to drive the machine can be applied to either of the shafts U Y, as may be desired or convenient. With this construction, as the grain passes through the machine, the chaff is withdrawn by the suction-fan G, the unthrashed heads and other coarse impurities are taken out by the sieves H, and the grain is graded by the ribbed plates J N.

As shown in the drawings, there will be as many grades of grain as there are pairs of ribs N upon the adjacent faces of the plates J; but by removing any desired number of the spouts O, or by arranging the spouts O to discharge their contents into any desired number of receivers, the grain can be separated into any desired number of grades.

Having thus fully described my invention, I claim as new and desire to secure by Letters Patent—

1. In a grain cleaner, separator, and grader, the combination, with the shoe C, provided with the sieves H, of the vertical plates J, provided with ribs N, substantially as and for the purpose set forth.

2. In a grain cleaner, separator, and grader, the combination, with the shoe C, provided with the sieves H, of the vertical plates J, provided with the graduated ribs N, and the spouts O, substantially as and for the purpose set forth.

3. In a grain cleaner, separator, and grader, the combination, with the slotted hopper B and the shaft U, of the shoe C, provided with the horizontal plate D, projecting into the hopper, the plates J, rigidly connected to the shoe, the springs P, the pitman S, and the eccentric T, substantially as herein shown and described, whereby the shoe and plates will be vibrated together and the horizontal plate D moved forward and backward by said vibration to produce an intermittent feed, as set forth.

4. In a grain cleaner, separator, and grader, the combination, with the frame A, of the shoe C, provided with the screens H, the vertical plates J, provided with the ribs N and spouts O, the springs P, and means, substantially as herein shown and described, for vibrating said shoe and plates, as and for the purpose set forth.

WILLIAM EDWARD WILD.

Witnesses:
 E. B. CUSHMAN,
 W. N. COALTER.